J. L. PECH.
PHOTOGRAPHIC AND CINEMATOGRAPHIC PROJECTION.
APPLICATION FILED MAY 8, 1919.

1,330,447. Patented Feb. 10, 1920.

Witnesses

Inventor
Jacques Louis Pech,
By
Attorney

UNITED STATES PATENT OFFICE.

JACQUES LOUIS PECH, OF MONTPELLIER, FRANCE, ASSIGNOR TO THE GLIFOGRAPH CORPORATION, OF DOVER, DELAWARE, A CORPORATION OF DELAWARE.

PHOTOGRAPHIC AND CINEMATOGRAPHIC PROJECTION.

1,330,447.  Specification of Letters Patent.  Patented Feb. 10, 1920.

Application filed May 8, 1919. Serial No. 295,630.

*To all whom it may concern:*

Be it known that I, JACQUES LOUIS PECH, doctor of medicine, citizen of the French Republic, residing at Montpellier, Department of Hérault, France, have invented certain new and useful Improvements in Photographic and Cinematographic Projections; and I do hereby declare the following to be a full, clear, and exact description of the invention, such as will enable others skilled in the art to which it appertains to make and use the same.

The invention relates to picture projection and more particularly to photographic and cinematographic projections.

It has mainly for its object to obtain in a better and more simple manner than hitherto, with such projections, the impression of relief.

The invention consists mainly in using, a screen for receiving projected pictures having a curved surface, the curvature of which is determined by the dimensions of the image-receiving part of the screen, which dimensions are determined, for a given size of film, on the one hand by the distance between the projection apparatus and the said screen, and, on the other hand, by the characteristics of the lens of the said apparatus.

The invention consists further in other features which will be clearly set forth hereinafter.

The invention will be clearly understood with the aid of the following description and an example of the invention is illustrated in the accompanying drawing.

Figure 1:
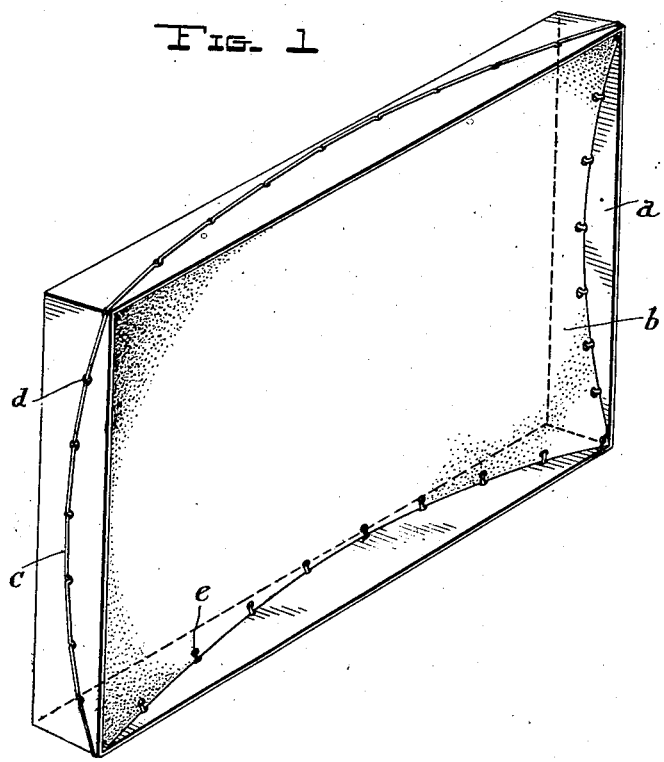

Figure 1 of the drawing shows, in perspective view, a screen constructed in accordance with the invention.

Figure 2:
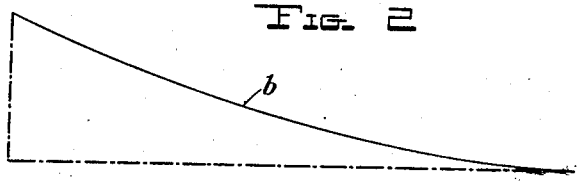
Figure 3:
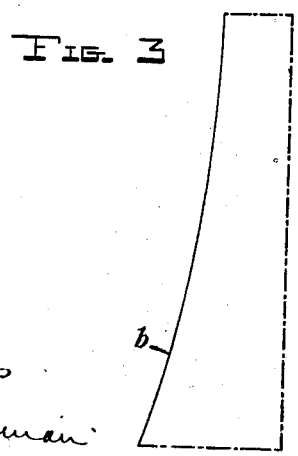

Fig. 2 represents one-half of the symmetrical hyperbola at the top and bottom of the screen and Fig. 3 represents one-half of the symmetrical hyperbola at the sides of the screen.

According to the present invention, in order to obtain with an ordinary projection apparatus, photographic or cinematographic projections giving the impression of relief, use is made of a screen which, instead of being plane as usual, is suitably curved, the curvature being either concave or convex according to the circumstances. The form to be given to the screen is determined by trials as its form should take into account the dimensions of the image-receiving part of the screen, the curvature being such as to distort the image on the screen so as to produce on the retinas of the eyes of observers images distorted in substantial correspondence with the distortion on the retinas of the observers' eyes of the images that would have been received from the natural object represented by the picture.

With such a screen, the images received by the screen give to the spectators an impression of relief. In other words, the image of the photograph projected onto the screen is deformed by the curvatures of the screen to correspond substantially with the deformation of an image on the retina of the eye due to the physiological characteristics of the optical system of the eye, when natural objects are viewed.

It is to be observed that the impression of relief is thus obtained in a more simple manner than with the stereoscopic processes which necessitate double photographs.

The fatigue resulting from constant effort to readjust the impressions received to the natural objects represented is obviated according to this invention. The fact is that pictures exhibited in accordance with this invention may be viewed with practically no fatigue.

As an example, it has been practically observed that, with a screen 20 feet long and 15 feet 6 inches high, receiving exactly the projection of photographs which are 1 inch long and three-fourths of an inch high, the spectators being at a distance from the screen equal to, or greater than, 15 feet, a very good curvature can be given to the screen by mounting and stretching, in such a manner, in a rectangular frame $a$, a fabric $b$ of such size, and the corners of the fabric are at the front corners of said frame, that the upper and lower edges of the fabric have the form of an arc of a hyperbola, and that the side edges of the fabric have the form of an arc of another hyperbola, the concavity of the two hyperbolas being directed toward the spectators.

The hyperbolas shown have been determined as follows: The length of the screen divided by eight has given the altitude of a cone erected on the diagonal of the front plane of the rectangular frame as the base diameter, the intersections with this cone of planes of the top, bottom and ends of the rectangular frame (which are parallel to the axis of the cone) giving the hyperbolas shown as outlined thereon in Fig. 1, and separately delineated in half hyperbolas in Figs. 2 and 3. It has been found that the divisor varies with different sizes of screens, increasing with larger screens and diminishing with smaller screens, but the variations in the divisor must be determined by trial.

Different means may be used for connecting the fabric b composing the screen, to its supporting frame. For example, if the curvature of the screen has been previously determined, strings c may be passed through holes d in the sides of the frame at correspondingly determined points, the strings being laced through eyelets e which may be provided in the fabric b adjacent to its edges.

Obviously the screen could be made of a suitable material capable of being conveniently molded.

It is obvious that the invention is in no way limited to the method of carrying it out which has been described, but comprises all modifications within the scope of the claims.

I claim as my invention—

1. A screen for exhibiting projected pictures having a curved image-receiving surface, such surface being curved in two directions in varying degrees with lines of curvature individually decreasing in degree of curvature toward the margin of the screen, the theoretical extensions of such lines of curvature approaching oblique straight lines diverging from a point exterior to such lines of curvature, so as to distort the image on the screen in such manner as to convey to observers the impression of relief.

2. A screen for exhibiting projected pictures having a hyperboloidal image-receiving surface.

3. A screen for exhibiting projected pictures, the image-receiving surface of which is differentially curved, the curvature of said surface in one direction conforming with an arc of one hyperbola, and the curvature of such surface in another direction conforming with an arc of another hyperbola.

4. A screen for exhibiting projected pictures comprising a frame and a fabric stretched within and secured at its edges to the frame on arcs of hyperbolas in two directions.

In testimony whereof I have hereunto set my hand in presence of the subscribing witness.

JACQUES LOUIS PECH.

Witness:
EUGÈNE TULLIER.